United States Patent
Duncan (10) Patent No.: US 6,842,902 B2
(45) Date of Patent: Jan. 11, 2005

(54) ROBUST DEVICE DRIVER TOKEN MANAGEMENT FOR UPGRADED COMPUTERS USING LEGACY DEVICE CARDS

(75) Inventor: William Lee Duncan, Berthoud, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 677 days.

(21) Appl. No.: 09/929,953

(22) Filed: Aug. 15, 2001

(65) Prior Publication Data

US 2003/0037179 A1 Feb. 20, 2003

(51) Int. Cl.[7] .............. G06F 3/00; G06F 9/44; G06F 9/46; G06F 13/00
(52) U.S. Cl. .............. 719/321; 714/799; 714/800; 714/805
(58) Field of Search ................ 719/321–327, 719/6, 21, 48–53, 701–702, 799–805

(56) References Cited

U.S. PATENT DOCUMENTS

| | | | | |
|---|---|---|---|---|
| 4,799,222 A | * | 1/1989 | Barlow et al. | 714/805 |
| 5,392,302 A | * | 2/1995 | Kemp et al. | 714/805 |
| 6,182,267 B1 | * | 1/2001 | Kidd et al. | 714/807 |

* cited by examiner

Primary Examiner—Meng-Al T. An
Assistant Examiner—Diem Cao
(74) Attorney, Agent, or Firm—Blakely, Sokoloff, Taylor & Zafman LLP (57) ABSTRACT

In one aspect of the invention is a method for robust device token management. In x+ bit computers using x bit device cards, tokens are used for managing communication requests from applications to a device by using x+ bit to x bit conversion techniques, accompanied by error checking.

23 Claims, 6 Drawing Sheets

ROBUST DEVICE DRIVER TOKEN MANAGEMENT FOR UPGRADED COMPUTERS USING LEGACY DEVICE CARDS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

This invention relates to the field of device drivers, and more specifically, to a robust method for managing hardware device driver tokens in upgraded computers without having to re-engineer the old device card.

BACKGROUND OF THE INVENTION

Figure 1:
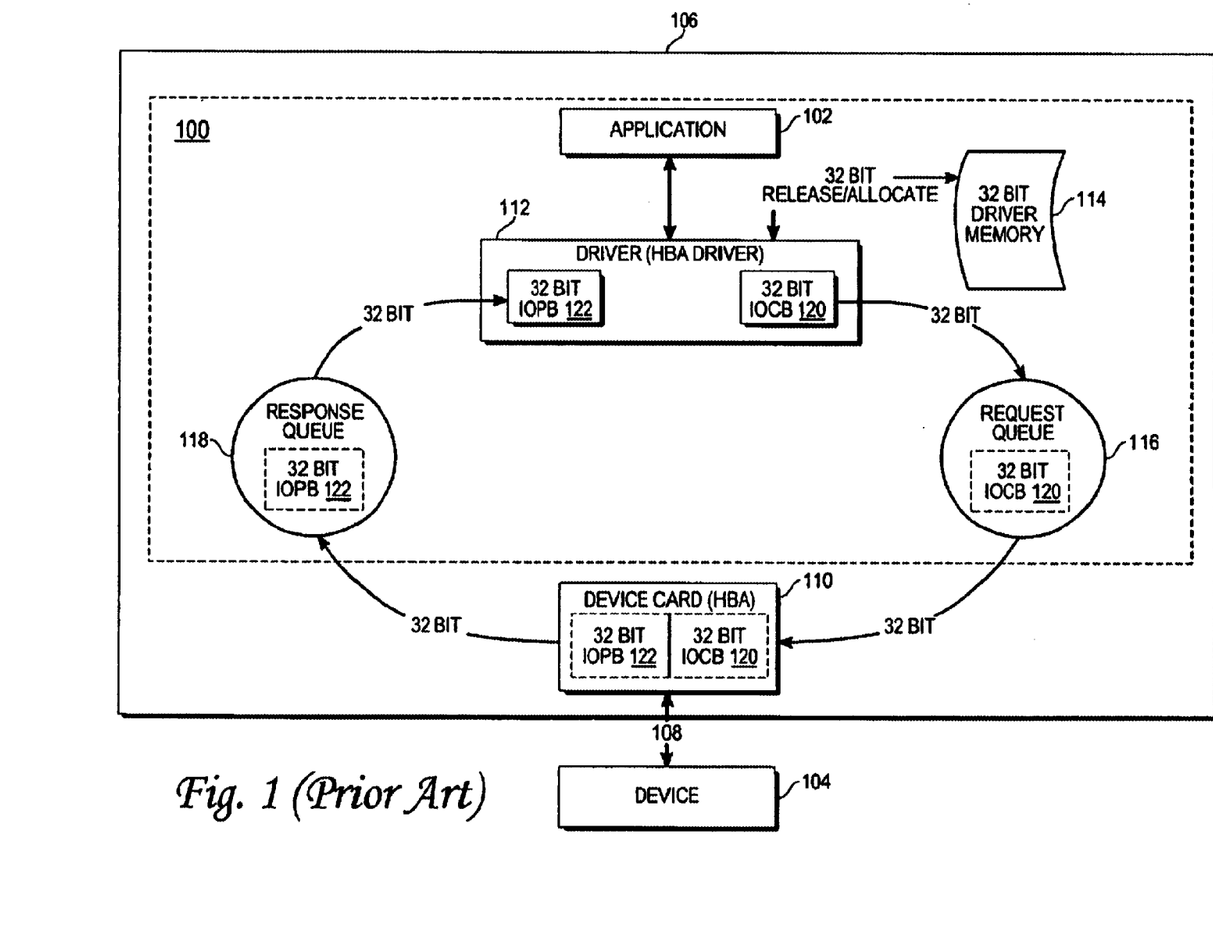
FIG. 1 illustrates a system in which an x bit computer and an x bit device card are used.

FIG. 1 illustrates a system 100 showing a typical operation between an application 102 and a device 104, such as a disk drive. A device 104 is connected to a computer 106 via a connection 108, such as a SCSI cable which is coupled to a card called a Host Bus Adapter (HBA) 110. The HBA 110 is coupled to the computer 106.

The computer 106 comprises a number of layers, including an application layer and an operating system layer. The application layer comprises the application 102 to communicate with the device 104. The operating system layer comprises a target driver (not shown) and an HBA Driver 112. The target driver communicates with a device 104 by using the services of the HBA driver 112 to allow applications 102 access to a particular device, such as a disk drive, for example. The HBA Driver 112 communicates with an HBA card 110.

Thus, applications 102 send requests for disk I/O to a target driver, and the target driver converts those to commands that an HBA 110 can execute and passes them down to the HBA driver 112. The HBA driver 112 passes the requests on to the HBA card 110. The HBA card 110 passes them down the SCSI bus cable 108, and the target device 104 (e.g., a disk) receives and operates on them.

An application 102 communicates with a device 104 through an HBA driver 112. For example, if an application 102 wants to communicate with a device 104 that is a disk drive, the application 102 sends the request to the HBA Driver 112, which, in turn, passes an IOCB 120 (Input/Output Control Block) to the device 104 via the HBA 110. An IOCB 120 comprises fields of information about the request, such as whether the request is a read or write, where to read from on the disk drive if the request is a read, a pointer to data if the request is a write, and which disk drive to read from or write to.

When the HBA Driver 112 passes an IOCB 120 to the HBA 110, it also saves request data in a driver memory 114 so that the HBA Driver 112 can track the status of requests that are sent to the HBA 110. The IOCB 120 is placed on a request queue 116 on the computer 106 until the HBA 110 is ready to process the IOCB 120.

The IOCB 120 is then processed by the HBA 110, and the request satisfied (if at all) by the device 104. When the IOCB 120 completes, or has a problem, a response, or a corresponding IOPB 122 (Input/Output Parameter Block), which comprises information similar to the IOCB 120, is put on a response queue 118 until the HBA Driver 112 is ready to process the IOPB 122. The HBA Driver 112 must then match the IOPB 122 to the appropriate IOCB 120 so that the request (IOCB 120) is matched with the correct status (IOPB 122), and the address in the driver memory 114 in which the request data was saved can be released.

In the past, reconciling the IOPB 122 to the IOCB 120 was accomplished using pointers. One of the fields in the IOCB 120 comprises a request token that identifies an area of the driver memory 114 in which data about the request is stored. The request token comprised a pointer into the array. Later, computers were developed which gave users an option to operate in dual mode: thus, given a 64-bit computer, users could operate in 64-bit mode or 32-bit mode, for example. When a faster mode (i.e., 64-bits) was chosen, however, corresponding 64-bit pointers became problematic since the HBA 110 was only engineered to process 32-bit words. While the HBA could be reengineered to process in 64-bit or 32-bit mode, it was much easier to modify the software design of the HBA Driver 112.

Figure 2:
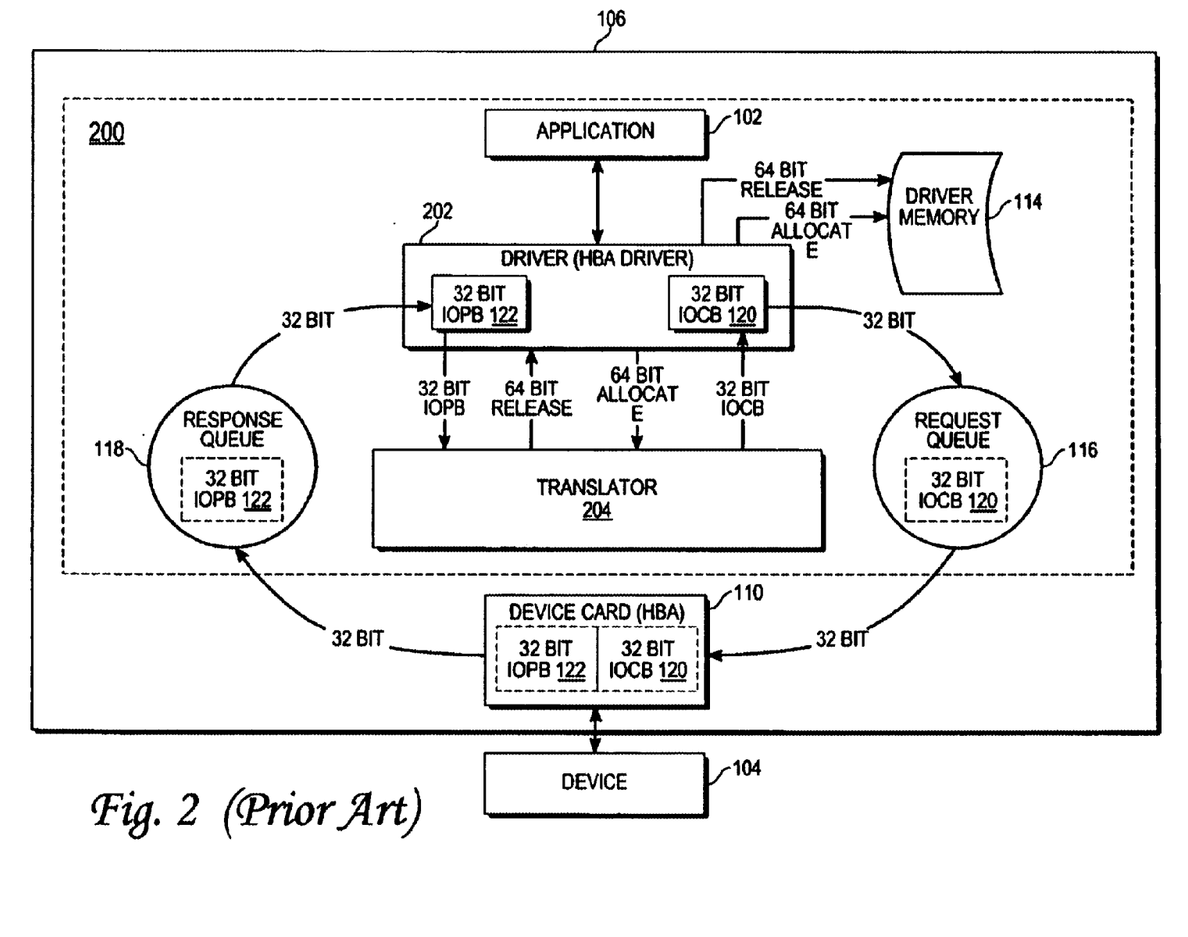
FIG. 2 illustrates a prior art system in which an x+ computer and x bit device card are used.

One solution to this was to implement a system 200, shown in FIG. 2, in which a translator 204 is used to convert a 64-bit word into a corresponding 32-bit word, and vice versa. When the 64-bit mode is chosen, 64-bit pointers allow $2^{64}$ addresses in the driver memory 114 to be accessed. When a request is received by the HBA Driver 202, a 64-bit pointer is created by the HBA Driver 202 to identify the request, and data about the request is stored in a driver memory 114 address corresponding to the 64-bit pointer. However, since the pointer is 64 bits, and the HBA 110 is engineered to read 32-bit words, a conversion needs to take place before the IOCB 120 can be sent to the HBA 110.

To accommodate the larger 64-bit token, the translator 204 converts the 64-bit pointer into a 32-bit token that can be placed into the token field of the IOCB 120, so that the HBA 110 can read a 32-bit token. When the HBA 110 sends a response upon completing the request, an IOPB 122 comprising the 32-bit token is sent back to the HBA Driver 202. However, in order for the HBA Driver 202 to match the response to the correct request, the 32-bit token must be converted back to the 64-bit pointer corresponding to the driver memory 114 where the request data is stored. Thus, the translator 204 converts the 32-bit token in the IOPB 122 token field back into a 64-bit pointer into the driver memory 114, and the address is then released for subsequent requests.

While the solution works for valid addresses in the driver memory 114, the solution is not robust. If the hardware fails, and the conversion from a 2-bit token to a 64-bit token generates a wrong 64-bit token, then the wrong request is referenced, and the wrong address released. Even worse for some systems, if the conversion generates a 64-bit token that has never been used, the system may crash.

SUMMARY OF THE INVENTION

In one aspect of the invention, a method for robust handling of device driver tokens is disclosed. The method comprises receiving a request to communicate with an x bit device card that is associated with a device driver and an x+ bit computer; creating an x+ bit pointer and storing data corresponding to the request in a memory associated with the device driver at the address corresponding to the x+ bit pointer; passing the request to the device card by creating a first control block having an x bit token field, the creating comprising converting the x+ bit pointer to a y bit token corresponding to the request and a z bit word corresponding to an error checking token (such that y+z=x); receiving a response from the device card upon completion of the request, the response having a second control block, the second control block having the x bit token; determining if the x+ bit pointer is valid; and if the x+ bit pointer is valid, then converting the x bit token back into the x+ bit pointer; and passing the x+ bit pointer back to the driver to release the address corresponding to the x+ bits.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In one aspect of the invention, a robust method for handling x bit tokens in an x+ bit computer system, where x is less than x+, is disclosed. For instance, if x is 32 bits and x+ is 64 bits, then a device driver corresponding to a 64-bit computer receives a request to communicate with a device via a 32-bit device card. The device driver creates a 64-bit pointer corresponding to the request, and saves information about the request in a memory corresponding to the driver at the address corresponding to the 64-bit pointer. The 64-bit pointer is then converted into a 32-bit token, which is placed in a request control block to be passed to the 32-bit device card. The request control block comprises a field called a token, and the token comprises the 32-bit token.

The device card processes the request, creates a response control block, and sends the response control block back with its token field comprising the 32-bit token. The 32-bit token is then converted back to the 64-bit pointer. Before reconciling the 64-bit pointer with the response data in the driver memory, the 32-bit token is validated. If the 32-bit token is valid, then the request is satisfied and the address corresponding to the 64-bit pointer is released for subsequent requests.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs (Compact Disc-Read-only Memories), and magneto-optical disks, ROMs (Read-only Memories), RAMs (Random Access Memories), EPROMs (Erasable Programmable Read-only Memories), EEPROMs (Electromagnetic Erasable Programmable Read-only Memories), magnetic or optical cards, flash memory, or other type of media/machine-readable medium suitable for storing electronic instructions.

Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

While examples herein shall refer to a 64-bit (i.e., x+) computer and a 32-bit (i.e., x) device card, it should be understood by one of ordinary skill in the art that the invention is not limited to this configuration of computer and device card. For example, the invention has equally applicability to 32-bit computers using 16-bit device cards, and other configurations as well.

Introduction

Figure 3:
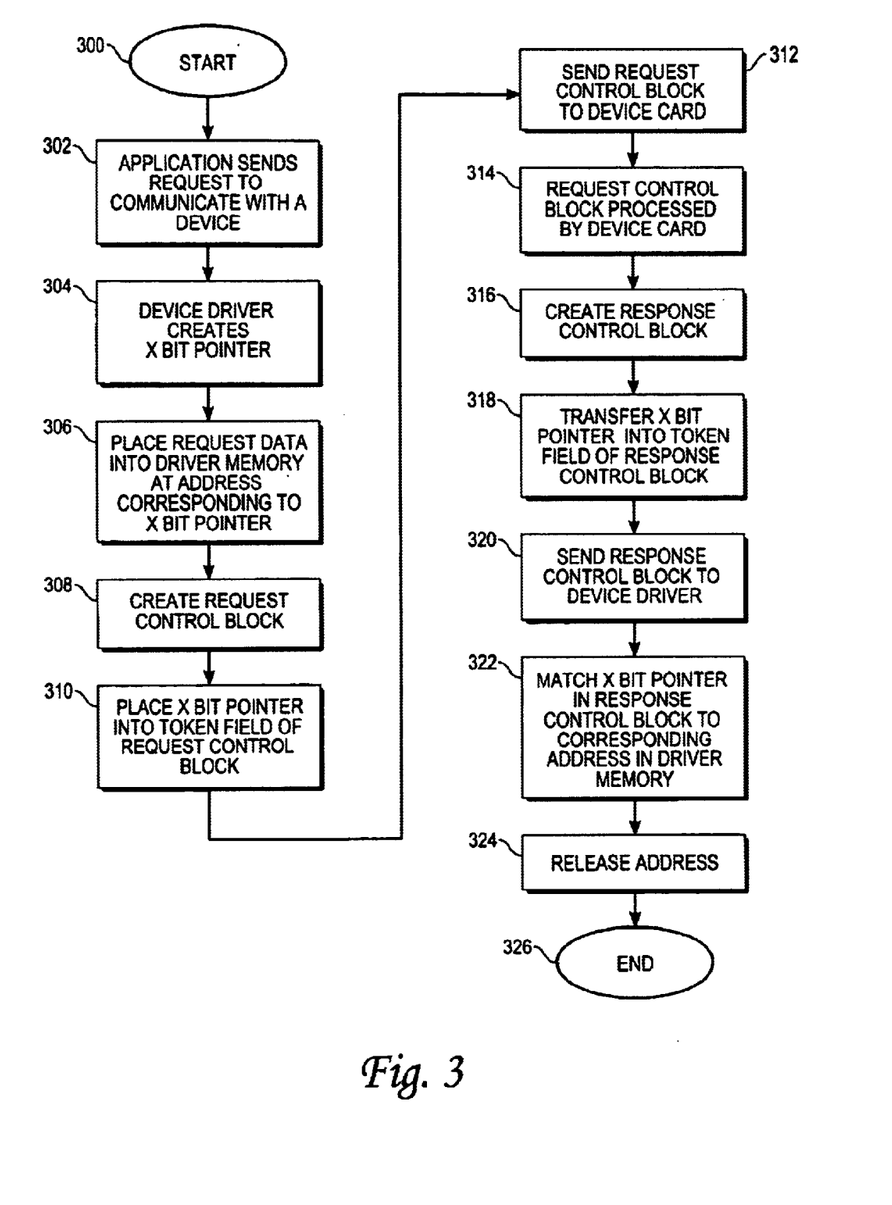
FIG. 3 illustrates a method of the system of FIG. 1.

FIG. 3 is a flowchart illustrating a prior art method of the system shown in FIG. 1, where an x bit driver and x bit computer are used. The method starts at block 300, and continues to block 302 where an application sends a request to communicate (i.e., read or write, for example), with a device. At block 304, a device driver creates an x bit pointer, and places request data into a driver memory at an address corresponding to the x bit pointer at block 306. A request control block is created at block 308, and the x bit pointer is placed into a token field of the request control block at block 310.

At block 312, the request control block is sent to the device card, and the request control block is processed by the device card at block 314. The device card creates a response control block at block 316, and at block 318, the x-bit pointer is transferred into the token field of the response control block. At block 320, the response control block is sent to the device driver, and at block 322, the device driver matches the x bit pointer in the response control block to the address corresponding to the x bit pointer in the driver memory, and at block 324, the address is released. The method ends at block 326.

Figure 4:
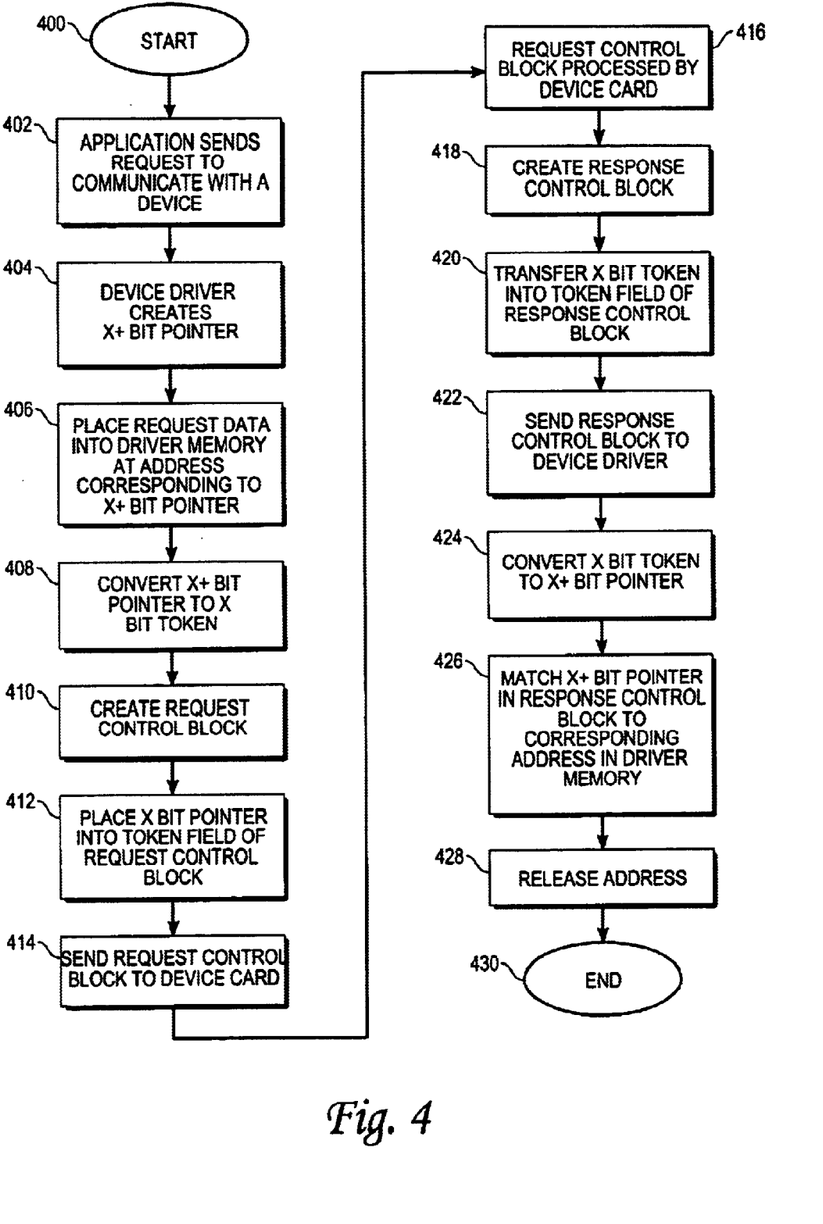
FIG. 4 illustrates a method of the system of FIG. 2.

FIG. 4 is a flowchart illustrating the method of the system shown in FIG. 2, where an x bit driver and x+ bit computer are used. The method starts at block 400, and continues to block 402 where an application sends a request to communicate (i.e., read or write, for example), with a device. At block 404, a device driver creates an x+ bit pointer, and places request data into a driver memory at an address corresponding to the x+ bit pointer at block 406. At block 408, the x+ bit pointer is converted to an x bit token to accommodate the device card. A request control block is created at block 410, and the x bit token is placed into a token field of the request control block at block 412.

At block 414, the request control block is sent to the device card, and the request control block is processed by the device card at block 416. The device card creates a response control block at block 418, and at block 420, the x-bit token is transferred into the token field of the response control block. At block 422, the response control block is sent to the device driver, and at block 424, the x bit token is converted back to an x+ bit pointer. At block 426, the device driver matches the x+ bit pointer in the response control block to the address corresponding to the x+ bit pointer in the driver memory, and at block 428, the address is released. The method ends at block 430.

Figure 5:
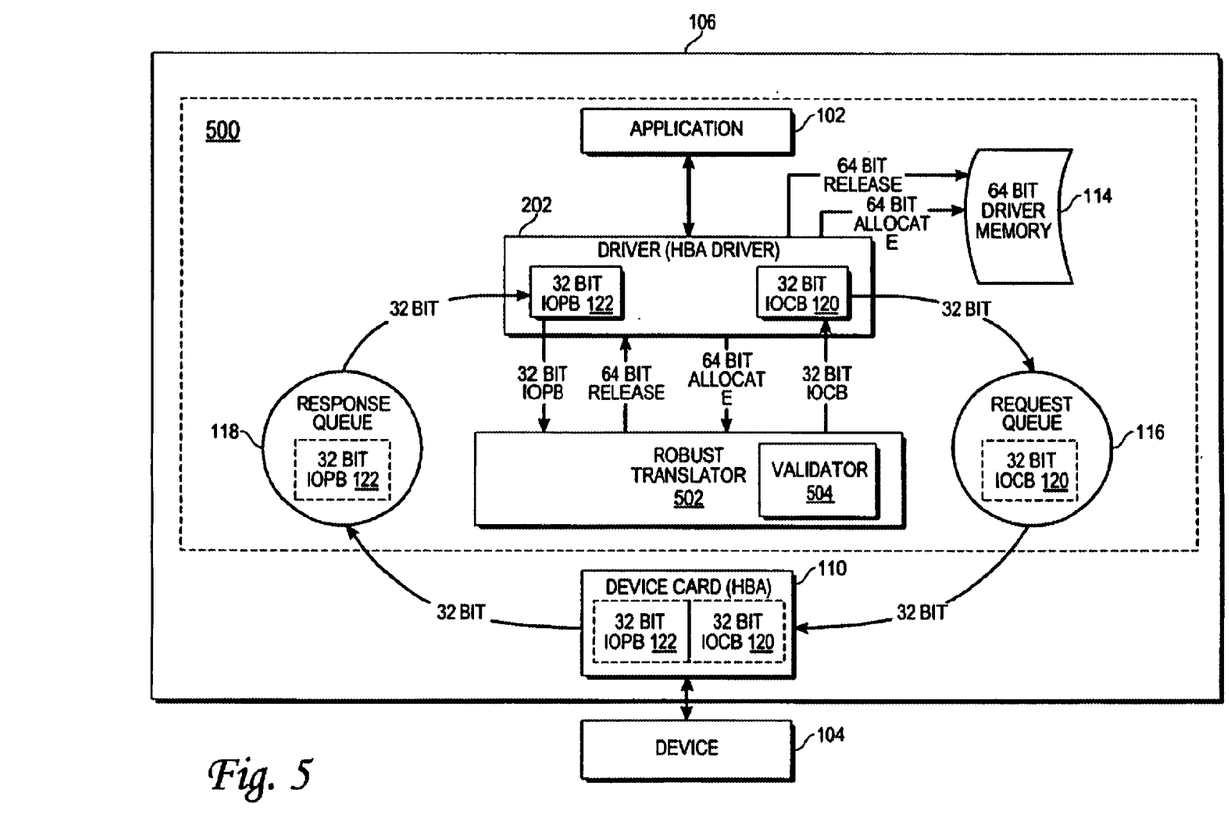
FIG. 5 illustrates a system in accordance with embodiments of the invention.

FIG. 5 illustrates a system 500 according to preferred embodiments of the present invention. When a request is received by the HBA Driver 202, the HBA Driver 202 creates a 64-bit pointer that references an address in the driver memory 114, and data about the request is then stored at the address corresponding to the 64-bit pointer. A 32 bit word is then created as follows.

A robust translator 502 converts the 64-bit pointer to a y bit word that can be processed by the HBA 110, where y is less than 64 bits, less than or equal to 32 bits, and where y is dependent upon a level of protection chosen by the user (to be discussed). Where y is less than 32 bits, a z bit word for error checking in accordance with the level of protection chosen by the user is also created, where z=32−y. Where y is equal to 32, no error checking is selected, and z=0. Generally speaking, x=y+z. An IOCB 120 is then created comprising the 32 bit word.

When the HBA 110 sends a response upon completing the request, an IOPB 122 comprising the 32 bit word is sent back to the HBA Driver 202. However, in order for the HBA Driver 200 to match the response to the correct request, the 32 bit word must be converted back to the 64-bit pointer corresponding to the driver memory 114 where the request data is stored.

To ensure that the y bit token passed back by the HBA 110 is the same y bit token as the y bit token passed into the HBA 110, so that the robust translator 502 generates the correct address in the driver memory 114, a validator 504 performs error checking on the x bit token passed by the IOPB 122. If the IOPB 122 x bit token is valid, then the robust translator 502 converts the y bit token in the IOPB 122 token field back into a 64 pointer using a hash function and hash buckets. The 64-bit pointer is then matched to the 64 bit address in the driver memory 114, and the address is then released for subsequent requests.

Although the validator 504 is shown as an object that is part of the robust translator 502, it should be understood by one of ordinary skill in the art that the validator 504 may be an object separate from the robust translator 502. Similarly, while the robust translator 504 is shown as a separate object from the driver 202, it should also be understood by one of ordinary skill in the art that the driver 202 may be part of the robust translator 504.

Figure 6:
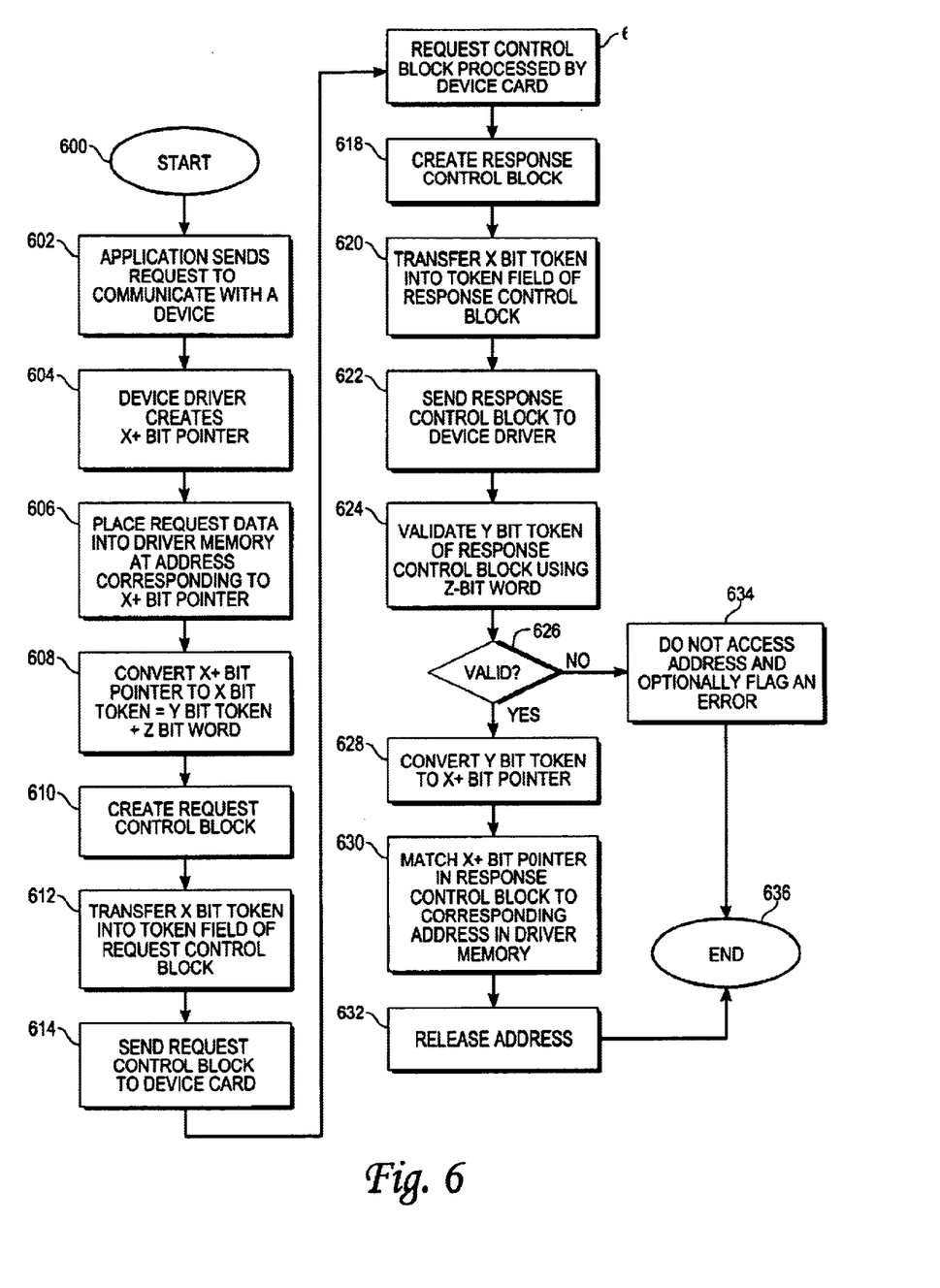
FIG. 6 illustrates a method of the system of FIG. 5.

FIG. 6 is a flowchart illustrating the method of the system shown in FIG. 5, where an x bit driver (e.g. 32 bits) and x+ bit (e.g. 64 bits) computer are used. The method starts at block 600, and continues to block 602 where an application sends a request to communicate (i.e., read or write, for example) with a device. At block 604, a device driver creates an x+ bit pointer, and places request data into a driver memory at an address corresponding to the x+ bit pointer at block 606. At block 608, an x bit token is created by converting the x+ bit pointer to a y bit token, and a z bit word.

A request control block is created at block 610, and the x bit token is transferred into a token field of the request control block at block 612. At block 614, the request control block is sent to the device card, and the request control block is processed by the device card at block 616. The device card creates a response control block at block 618, and at block 620, the x bit token is transferred into the token field of the response control block. At block 622, the response control block is sent to the device driver, and at block 624, a validator validates the response control block y bit token using the z bit word.

If the response control block y bit token is valid at block 626, then at block 628 a translator converts the y bit token to the x+ bit pointer, and at block 630 the device driver matches the x+ bit pointer to the corresponding address in the driver memory. At block 632, the address corresponding to the x+ bit pointer is released, and the method ends at block 636.

If the response control block y bit token is invalid at block 626, then at block 634, the response control block is not validated, thereby preventing a wrong address from being accessed or released. An error may also be returned to the application.

Translator

In embodiments of the invention, the translator converts an x+ bit pointer into a y bit token, and converts a y bit token into an x+ bit pointer. Using a hash function, an x+ bit pointer is converted to a unique y bit token. The y bit token is placed into a bucket, or a linked list, that is determined by the hash function. Optionally, a z bit protection field may also be added.

Validator

A validator 504 can perform error checking on the response control block y bit token in one of many ways. The following are examples of algorithms that may be used to validate the integrity of the y bit token. The examples assume a 32-bit token (i.e., x) returned by a 32-bit HBA, and a 64-bit (i.e., x+) computer.

No Error Checking

This is the simplest and fastest method, and is most appropriately used in cases where hardware corruption of the token is not likely. When no error checking is requested, a no error checking word z is created, and an x+ bit pointer is converted into a y bit token, where y=x.

Parity Error Checking

This method is effective in catching single-bit errors in the token value. While it uses the same amount of memory as the no error checking method, it is somewhat slower since it has to calculate and check odd parity. Where parity error checking is requested, a 1 bit error checking word is created where z=1, and an x+ bit pointer is converted into a y bit token, where y=x−1. Thus, in a 32/64 bit dual mode computer, x+=64, x=32, y=31, and z=1 allowing for $2^{31-1}$ tokens.

In odd parity checking, for example, the number of set bits (i.e., bits equal to 1) are counted as the computer sends the IOCB to the device. If the number of set bits is odd, then the parity bit is set to 0, and if the number of set bits is even, the parity bit is set to 1. In this way, every 32 bit token has an odd number of set bits. After the device processes the IOCB, and before the IOPB is passed back to the device for translating the 31 bit token to a 64 bit token, the parity of the 32 bit token is checked. If the total number of set bits is odd, then the 31 bit token has been validated. Otherwise, the 31 bit token is rejected as invalid.

Checksum/Round Robin Error Checking

Checksum is a method to detect errors in a stream where a sum operation is operated on a group of bytes where the last byte is the checksum value. When all the numbers in the package are added, the sum should equal the checksum byte if there is no transmission error. This method offers a high level of protection to the token. In a 32/64 bit mode computer, checksum uses 4 bits for the checksum value, 4 bits for a round-robin count per token, and 24 bits for the token, allowing for $2^{24-1}$ tokens.

Thus, when the computer sends the IOCB to the device, nibbles (i.e., half a byte) of the 24 bit token are summed, and then the 4 bit checksum value (error checking word) is added to the sum of the nibbles such that the total summation of the 24 bit token equals the 4 bit checksum value. It should be understood by one of ordinary skill in the art, however, that subsets other than nibbles of a token may be used, such as bytes.

For each token, there are 4 bits reserved to track different uses of the token. This allows the same token to be used $2^4$ different times, such as where a token address is not able to be released, without causing duplication Exemplary Embodiment In one exemplary implementation, routines used to implement the method and system described above are DDI (Device Driver Interface) compliant. The routines help manage the tokens that device drivers need to be able to keep track of the I/O command requests that are currently outstanding to a device.

The routines supply users with a level of protection for the x-bit token value (i.e., 32 bit) to protect against hardware corruption of the token value. In an exemplary embodiment, there are 3 levels of protection available.

Synopsis include <sys/ddi_token.h> int ddi_token_init(char*desc, size_t, start tokens, int flags, ddi_token_handle_t**handlep);

void ddi_token_fini(ddi_token_handle_t*h);

int ddi_token_alloc(ddi_token_handle_t*h, uint32_t tokenp, void*ptr, int kmem flag);

int ddi_token_lookup(ddi_token_handle_t*h, uint32_t token void**ptrp;

int ddi_token_free(ddi_token_handle_t*h, uint32_t token);

Description

A routine called ddi_token_init( ) is used to set up the token space used by the commands, and returns a handle to that space which is used in all other DDI token function calls. The setup is typically done at attach time in a device driver.

The start_tokens value passed in is a hint to ddi_token_init( ) on how large to make the token space, but it is not a limitation. If these routines need more space as they are running, they will allocate it.

The flags parameter is used to pass in various flags to the ddi_token_init( ) routine. Among other things, these flags control which protection algorithm is used.

The routine ddi_token_simple_index( ) uses a simple token indexing method. This method is the simplest and fastest, but has no protection against hardware errors, so is most appropriately used in cases where hardware corruption of the token is not possible or not likely. In an exemplary implementation, this method sets aside all 32 bits of the token as an index value.

The routine ddi_token_odd_parity_index( ) uses, in an exemplary implementation, odd parity indexing method to catch single bit errors in the token value. This method uses the same amount of memory as ddi_token_simple_index( ), but is somewhat slower, since it has to calculate and check odd parity. In an exemplary implementation, this method sets aside one bit for parity and uses the other 31 bits for the index value.

The routine ddi_token_chksum_rr_index( ) uses a checksum and a round-robin serial number indexing method to give maximum protection to the token. This method is the most robust in the case of hardware errors but uses the most memory and time. This method, in an exemplary implementation, uses 4 bits for a checksum value, 4 bits for a round-robin count per index, and 24 bits for the index.

The routine ddi_token_fini( ) undoes the setup done by ddi_token_init( ), and would typically be called by a driver at detach time. The token handle is no longer valid after this call.

The routine ddi_token_alloc( ) is used to create a 32-bit token given a 32 or 64 bit pointer, for example. The kmem_flag parameter is used to tell ddi_token_alloc( ) whether or not it is okay to sleep when trying to allocate memory.

The routine ddi_token_lookup( ) is used to look up the 32 or 64 bit pointer given the token allocated earlier with ddi_token_alloc( ). ddi_token_free ( ) frees a token allocated with ddi_token_alloc( ).

The above routines return DDI_SUCCESS, DDI_FAILURE, or one of the following values, depending on the routine:

DDI_TOKEN_BAD_ARG can be returned by any ddi_token*( ) routine when a bad argument (such as a null pointer or an illegal flag value) is passed in.

The routine ddi_token_alloc( ) can return the following additional error values:

DDI_TOKEN_NO_MEM can be returned when the kmem_flag value is km_sleep and no memory is available.

The routine ddi_token_lookup( ) can return the following additional error return values:

DDI_TOKEN_NULL_TOKEN_VALUE when a token value of zero is detected (since zero is not a legal token value).

DDI_TOKEN_BAD_TOKEN_VALUE when a token appears to be invalid (e.g., the checksum or parity is incorrect).

DDI_TOKEN_NOT_FOUND when the requested token is not found in the token space.

Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, while embodiments herein have been described with respect to a 64 bit computer and 32 bit device card, it should be understood by one of ordinary skill in the art that the invention is not so limited, and that it is equally applicable to other computer/device card bit configurations as well.

As another example, the invention is not limited to the error checking methods described herein. It is certainly contemplated that other error checking methods, such as a checksum method without round robin, may be used as well.

What is claimed is:

1. A method of managing device driver tokens, comprising:

receiving a request to communicate with a device associated with an x bit device card, the x bit device card being associated with a device driver, and the request being received on an x+ bit computer;

creating an x+ bit pointer corresponding to the request, the x+ bit pointer having a value based on the x+ bits;

storing data corresponding to the request in a memory associated with the driver at the address corresponding to the x+ bit pointer;

passing the request to the device card by creating a first control block having an x bit token field, the creating comprising converting the x+ bit pointer to an x bit token having a y bit token associated with the x+ bit pointer, and a z bit word corresponding to an error checking identifier;

receiving a response from the device card upon completion of the request, the response having a second control block, the second control block having the x bit token;

determining if error checking is requested;

if error checking is requested, then validating the x bit token; and if the x bit token is valid, then:
converting the y bit token back into the x+ bit pointer; and
passing the x+ bit pointer back to the driver to release the address corresponding to the x+ bit pointer.

2. The method of claim 1, wherein x comprises 16 bits, and x+ comprises 32 bits.

3. The method of claim 1, wherein x comprises 32 bits, and x+ comprises 64 bits.

4. The method of claim 1, wherein said validating the x bit token comprises using the z bit word for parity checking.

5. The method of claim 1, wherein said validating the x bit token comprises using the z bit word in a check sum algorithm.

6. The method of claim 1, wherein said converting the x+ bit pointer to a y bit token and a z bit word comprises:

using a hash function to convert the x+ bit pointer into a unique y bit token; and storing the unique y bit token in a hash bucket as determined by the hash function.

7. The method of claim 1, further comprising if the x+ bit pointer is not valid, then preventing the address associated with the x+ bit pointer from being accessed.

8. A method of managing device driver tokens, comprising:

receiving a request to communicate with a device being associated with an x bit device card and a device driver, the request being received on an x+ bit computer, and x+ being greater than x;

creating an x+ bit pointer corresponding to the request;

storing data corresponding to the request in a memory at the address corresponding to the x+ bit pointer;

passing the x+ bit pointer into a hash function to generate a y bit token;

generating a z bit word in accordance with a requested level of error checking;

creating an x bit request control block comprising the y bit token and the z bit word, where x=y+z;

passing the x bit request control block to the device card;

in response to receiving a response from the device card upon completion of the request, creating a response control block having the x bit token;

if z<>0, then using z to validate the x bit token;

if x is valid, then:
using the hash function to convert the y bit token into an x+ bit pointer;
passing the x+ bit pointer back to the driver; and
releasing the address corresponding to the x+ bit pointer.

9. The method of claim 8, wherein said validating the x bit token comprises using the z bit word for parity checking.

10. The method of claim 8, wherein said validating the x bit token comprises using the z bit word in a check sum algorithm.

11. The method of claim 8, further comprising if the x+ bit pointer is not valid, then preventing the address associated with the x+ bit pointer from being accessed.

12. The method of claim 8, wherein the memory is associated with the driver.

13. A machine-readable medium having stored thereon data representing sequences of instructions, the sequences of instructions which, when executed by a processor, cause the processor to perform the following:

receive a request to communicate with a device associated with an x bit device card, the x bit device card being associated with a device driver, and the request being received on an x+ bit computer;

create an x+ bit pointer corresponding to the request, the x+ bit pointer having a value based on the x+ bits;

store data corresponding to the request in a memory associated with the driver at the address corresponding to the x+ bit pointer;

pass the request to the device card by creating a first control block having an x bit token field, the creating comprising converting the x+ bit pointer to an x bit token having a y bit token associated with the x+ bit pointer, and a z bit word corresponding to an error checking identifier;

receive a response from the device card upon completion of the request, the response having a second control block, the second control block having the x bit token;

determine if error checking is requested;

if error checking is requested, then validate the x bit token; and if the x bit token is valid, then:
convert the y bit token back into the x+ bit pointer; and
pass the x+ bit pointer back to the driver to release the address corresponding to the x+ bit pointer.

14. The machine-readable medium of claim 13, wherein the processor validates the x bit token by using the z bit word for parity checking.

15. The machine-readable medium of claim 13, wherein the processor validates the x bit token by using the z bit word in a check sum algorithm.

16. The machine-readable medium of claim 13, wherein the processor converts the x+ bit pointer to a y bit token and a z bit word by:

using a hash function to convert the x+ bit pointer into a unique y bit token; and storing the unique y bit token in a hash bucket as determined by the hash function.

17. The machine-readable medium of claim 13, further comprising if the x+ bit pointer is not valid, then the processor prevents the address associated with the x+ bit pointer from being accessed.

18. An apparatus for managing a device, comprising:
a device driver associated with an x+ bit computer to handle a request to communicate with a device associated with an x bit device card by:
    creating an x+ bit pointer; and
    storing information about the request at an address corresponding to the x+ bit pointer in a memory associated with the device driver;
a translator to convert the x+ bit pointer to an x bit token, the converting including:
    generating a y bit token; and
    generating a z bit word representing a level of error checking to validate the y bit token;
the device driver to further:
    create a request control block comprising the x bit token;
    to send the request control block to the x bit device card for processing;
    to receive a response control block comprising the x bit token from the device card; and
    to validate the x bit token of the response control block in accordance with the level of error checking determined by the z bit word; and
the translator to further convert the y bit token into the x+ bit pointer if the x bit token is valid; and
the device driver to further release the memory at the address associated with the x+ bit pointer if the x bit token is valid.

19. The apparatus of claim 18, wherein the translator is integrated with the device driver.

20. A system for robust device driver token management, comprising:
a device driver associated with an x+ bit computer to process a request to communicate with a device associated with an x bit device card by creating an x+ bit pointer;
a device driver memory to store data associated with the request at the address corresponding to the x+ bit pointer;
a robust translator to convert the x+ bit pointer to an x bit token comprising a y bit token associated with the x+ bit pointer, and a z bit word for validating the y bit token;
the device driver to further create a request control block comprising the x bit token, and to send the request control block to the x bit device card;
the x bit device card to process the request control block, to create a response control block in response to processing the request control block, and to send the response control block to the device driver;
the device driver to further validate the x bit token of the response control block in accordance with a level of error checking determined by the z bit word;
the translator to further convert the y bit token into the x+ bit pointer if the x bit token is valid; and
the device driver to further release the memory at the address associated with the x+ bit pointer if the x bit token is valid.

21. The system of claim 20, further comprising:
a request queue to hold the request control block for processing by the device card; and
a response queue to hold the response control block for processing by the device driver.

22. The system of claim 20, wherein the device driver validates the x bit token by using the z bit word for parity checking.

23. The system of claim 20, wherein the device driver validates the x bit token by using the z bit word in a check sum algorithm.

* * * * *